United States Patent [19]

Batchelor

[11] Patent Number: 4,792,256
[45] Date of Patent: Dec. 20, 1988

[54] IMPLEMENT WITH CONNECTOR JOINING HANDLE TO WORKING HEAD

[75] Inventor: Douglas R. Batchelor, Chicago, Ill.

[73] Assignee: Libman Broom Company, Arcola, Ill.

[21] Appl. No.: 940,084

[22] Filed: Dec. 10, 1986

[51] Int. Cl.⁴ .................... B25G 3/28; F16B 99/00
[52] U.S. Cl. .................... 403/296; 403/298; 403/299; 403/282; 403/343; 29/525; 15/146
[58] Field of Search .............. 403/299, 359, 292, 296, 403/298, 360, 256, 375, 273, 277, 279, 280, 282, 306, 24, 274, 284, 248, 343, 263; 15/146; 29/525

[56] References Cited

U.S. PATENT DOCUMENTS

| | | | |
|---|---|---|---|
| 1,455,793 | 5/1923 | Kindt | 403/296 |
| 2,140,014 | 12/1938 | Lasillo | 403/296 X |
| 3,000,656 | 9/1961 | Hollaender | 403/298 |
| 3,642,311 | 2/1972 | Edgemond, Jr. | 403/284 X |
| 3,680,897 | 8/1972 | Linthout | 29/525 X |
| 3,759,623 | 9/1973 | Hesse | 403/375 X |
| 3,876,319 | 4/1975 | Meyer | 403/343 |
| 4,003,668 | 1/1977 | Kelly, III et al. | 403/299 X |
| 4,111,577 | 9/1978 | Kiyosawa | 403/298 X |
| 4,232,422 | 11/1980 | Fellmann | 403/343 X |
| 4,371,282 | 2/1983 | Sturm | 403/277 |
| 4,440,391 | 4/1984 | Saenz, Jr. et al. | 403/296 X |
| 4,684,283 | 8/1987 | Lewis, Jr. | 403/263 X |

FOREIGN PATENT DOCUMENTS

| | | | |
|---|---|---|---|
| 2645255 | 4/1978 | Fed. Rep. of Germany | 15/146 |
| 1435715 | 5/1976 | United Kingdom | 403/298 |

Primary Examiner—Andrew V. Kundrat
Assistant Examiner—Peter M. Cuomo
Attorney, Agent, or Firm—Marshall, O'Toole, Gerstein, Murray & Bicknell

[57] ABSTRACT

An implement having a working head with a threaded socket; a metal tubular handle; a connector joining the handle to the head; the connector having a generally cylindrical body with a threaded portion at one end threadably inserted into the socket in the head; a fluted portion at the other end of the body, with the flutes being located axially of the body and spaced apart from adjacent flutes; the fluted portion being forced into the end of the handle with a tight friction fit so that other fastening means is not required; and a stop between the fluted portion and the threaded portion limiting the distance which the fluted portion can be forced into the end of the tubular handle.

10 Claims, 1 Drawing Sheet

IMPLEMENT WITH CONNECTOR JOINING HANDLE TO WORKING HEAD

This invention relates to tools or implements having a handle and a head joined to the handle. More particularly, this invention is concerned with an improved implement having a handle joined to the head by means of an improved connector.

BACKGROUND OF THE INVENTION

A wide variety of tools or implements, including utensils, comprise a working head to which a handle is connected. Some such implements are floor sweeping brushes or brooms, scrapers, applicators for surface coatings such as waxes, paints and varnishes, tamping tools, cutters and the like.

Many implements have a threaded socket into which the end of a handle is directly threaded or into which a connector on the handle end is threaded. When a tubular metal handle is used it is common to insert a connector into the handle end and to permanently unite it to the handle by a rivet extending through the handle and connector. The end of the connector extending beyond the handle end is threaded so that it can be removably threaded into the socket in the head.

Joining a connector to the handle by a rivet or equivalent fastener involves a series of separate manufacturing steps. Thus, holes must be made in the handle and the connector, the holes must then be aligned or kept aligned, the rivet must be inserted in the hole and then deformed to complete the riveting. Since handles are prepainted, deforming the rivet yields a shiny silver-like surface which detracts from the appearance of the product. Also, many times the handle is only loosely joined to the connector by riveting so that in use the implement head appears loose leaving the user uncertain as to whether the head or handle will come off. For these reasons an improved connector, and implements using it, are needed.

SUMMARY OF THE INVENTION

According to a first aspect of the invention there is provided a connector for joining the end of a tubular metal handle to an implement head. The connector can have a generally cylindrical body with a threaded portion at one end adapted to be threadably inserted into an implement head; a fluted portion at the other end of the body, with said flutes being located axially of the body and spaced apart from adjacent flutes; the fluted portion can be sized to be forced into the end of a tubular metal handle with a tight friction fit so that other fastening means is not required; and stop means can be located between the fluted portion and the threaded portion to limit the distance which the fluted portion can be forced into the end of a tubular handle.

The fluted portion can contain an axial bore. The stop means can be a collar or ring around the body.

The flutes can be concave with a curved profile in lateral section. The surface between adjacent flutes can be convex and adapted to be positioned in continuous uniform contact with a tubular handle interior surface. Desirably, the flutes are wider than the convex surface between adjacent flutes.

According to a second aspect of the invention an implement is provided having a working head with a threaded socket; a metal tubular handle; a connector joining the handle to the head; the connector having a generally cylindrical body with a threaded portion at one end threadably inserted into the socket in the head; a fluted portion at the other end of the body, with said flutes being located axially of the body and spaced apart from adjacent flutes; the fluted portion being force-fit into the end of the handle with a tight friction fit so that other fastening means is not required; and stop means between the fluted portion and the threaded portion limiting the distance which the fluted portion can be forced into the end of the tubular handle.

DETAILED DESCRIPTION OF THE DRAWINGS

To the extent it is reasonable and practical the same or similar elements which appear in the various views of the drawings will be identified by the same numbers.

Figure 1:
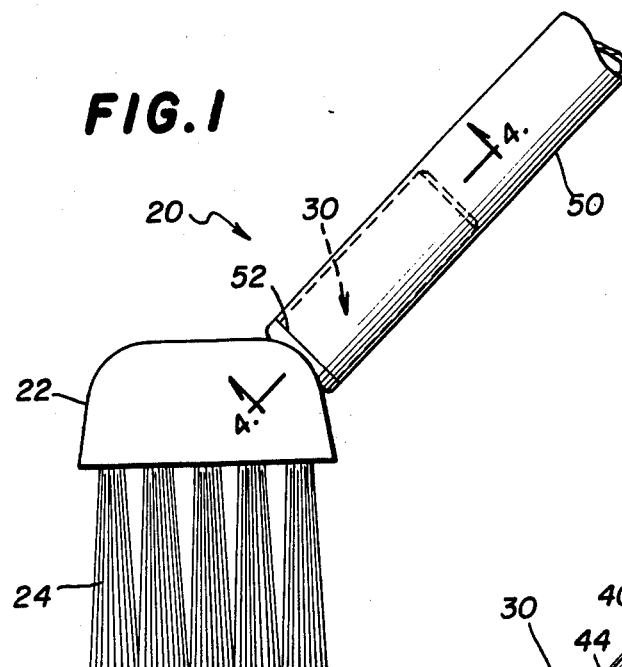
FIG. 1 a side elevational view of a push broom according to the invention with the upper portion of the handle removed.
Figure 2:
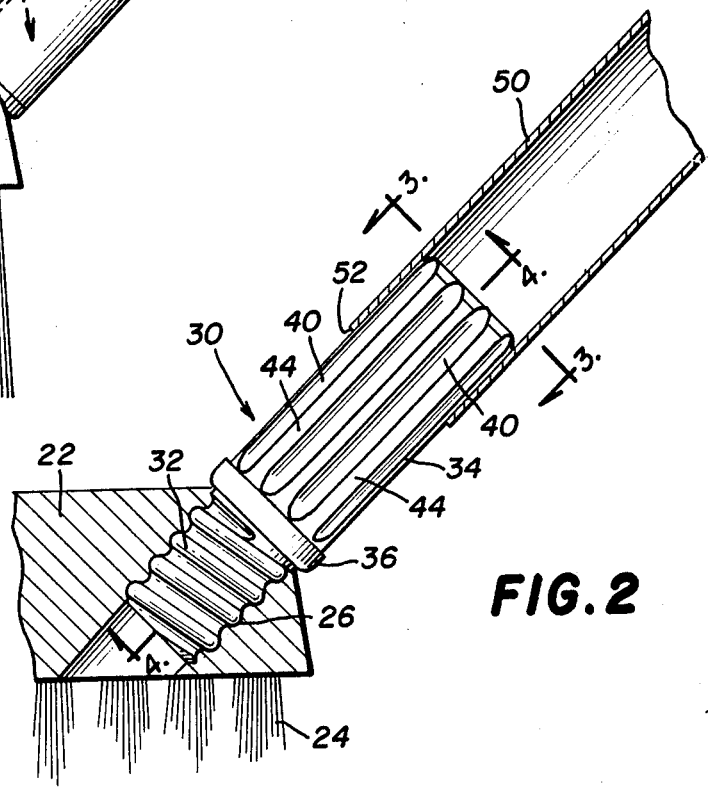
FIG. 2 is a side view, partially in section, of the broom shown in FIG. 1 with a connector shown threaded into a socket in the broom head and the handle partially installed on the fluted portion of the connector.
Figure 3:
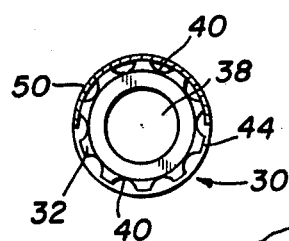
FIG. 3 is a sectional view taken along the line 3—3 of FIG. 2.
Figure 4:
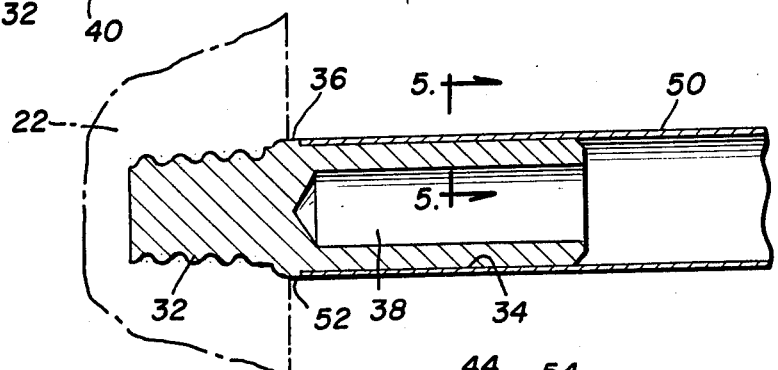
FIG. 4 is a sectional view taken along the line 4—4 of FIG. 2.

With reference to FIG. 1 the push broom 20, which is a representative tool or implement, has an elongated working head 22 with bristles or hairs 24 extending downwardly from the head bottom in a conventional manner. The head 22 can be made of any suitable material but usually is made of wood or a solid polymeric material, such as high density polypropylene, which can be reinforced with fibers, such as glass fibers. The head 22 has a centrally positioned threaded socket 26 in the upper side located at about a 45° angle.

Connector 30 has a generally cylindrical body with a threaded portion 32 at one end, a fluted portion 34 at the other end, and a peripheral ring or collar 36 between and separating the threaded and fluted portions. An axial bore or hole 38 is located in the fluted portion 34 of the connector 30. The presence of the hole conserves material and reduces weight.

The fluted portion 34 has a plurality of axially positioned and spaced apart flutes 40 located around the connector body. The flutes 40 are concave with a curved profile in lateral section. The surface between adjacent flutes 40 is convex with a curved surface 44 about equivalent to a segment of a cylindrical surface. The flutes 40 are generally wider at the top than the width of the convex curved surface 44 between flutes.

Connector 30 is desirably die cast of a suitable metal such as a zinc alloy, aluminum or steel. However, it can be made of a strong solid polymeric material.

The lower part of metal tubular handle 50 is forced over and onto the fluted portion 34 of connector 30 in a tight friction fit. The end 52 of the handle 50 slides along the fluted portion until it hits the side of collar 36 which stops further axial movement of the handle relative to the connector. It is to be understood that the connector 30 is installed on the handle before the connector is threaded into head 22.

Figure 5:
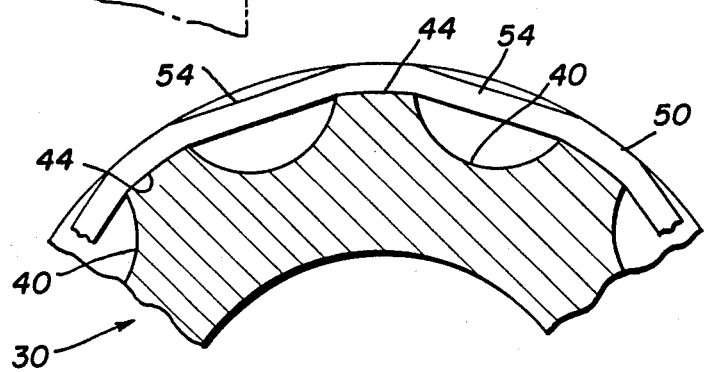
FIG. 5 a sectional view taken along the line 5—5 of FIG. 4.

The external dimensions of the fluted portion 34 and the flutes 40, and the internal diameter of tubular handle 50, are selected so that a force fit is produced by sliding the handle end onto the connector. It is desired that there be some slight deformation of the handle end when it is forced onto the handle. This is illustrated by FIG. 5 in which the convex curved surfaces 44 between flutes are in continuous uniform contact with the handle interior surface but the handle end portions 54 over the flutes 40 have been deformed from cylindrical sections into more flat or straight sections. This is accomplished by having the diameter of the fluted portion 34 slightly larger than the internal diameter of the handle end. In this way greater friction between the connector and handle is produced thereby more securely joining the connector to the handle. No other means is required to secure the handle and connector together. Specifically, no rivet, pin, bolt or similar fastener need join the handle and connector together. Thus, no holes need be made in the handle end or the connector. The end of the handle accordingly has a smooth pleasing appearance.

The foregoing detailed description has been given for clearness of understanding only, and no unnecessary limitations should be understood therefrom, as modifications will be obvious to those skilled in the art.

What is claimed is:

1. A metallic connector for joining the end of a tubular metal handle to an implement head:
   the connector comprising a generally cylindrical body having an externally threaded portion at one end adapted to be threadably inserted into an internally threaded hole in an implement head;
   an externally fluted cylindrical portion at the other end of the cylindrical body, with said flutes being located axially of the body and spaced apart from adjacent flutes;
   the fluted cylindrical portion having between adjacent flutes a convex curved surface constituting a segment of a cylindrical surface;
   the fluted portion being sized to be forced into and having a diameter slightly larger than the internal diameter of the end of a tubular metal handle, having an interior surface, with a tight friction fit so that other fastening means is not required; and
   stop means between the fluted portion and the threaded portion limiting the distance which the fluted portion can be forced into the end of a tubular handle.

2. A connector according to claim 1 in which the fluted portion contains an axial bore.

3. A connector according to claim 1 in which the stop means is a collar around the body.

4. A connector according to claim 1 in which the flutes are concave with a curved profile in lateral section.

5. A connector according to claim 4 in which the flutes are wider than the convex curved surface between adjacent flutes.

6. An implement comprising:
   a working head having a threaded socket;
   a metal tubular handle having an end;
   a metallic connector joining the handle to the head;
   the connector having a generally cylindrical body with an externally threaded portion at one end threadably inserted into the socket in the head;
   an externally fluted cylindrical portion at the other end of the cylindrical body, with said flutes being located axially of the body and spaced apart from adjacent flutes;
   the fluted cylindrical portion having between adjacent flutes a convex curved surface constituting a segment of a cylindrical surface;
   the fluted portion being force-fit into and having a diameter slightly larger than the internal diameter of the end of the handle with a tight friction fit so that other fastening means is not required; and
   stop means between the fluted portion and the threaded portion limiting the distance which the fluted portion can be forced into the end of the tubular handle.

7. An implement according to claim 6 in which the stop means is a collar around the body.

8. An implement according to claim 6 in which the flutes are concave with a curved profile in lateral section.

9. An implement according to claim 8 in which the flutes are wider than the convex curved surface between adjacent flutes.

10. An implement according to claim 6 in which the handle end is smooth internally and externally and the external diameter of the fluted portion is slightly larger than the internal diameter of the handle end.

* * * * *